(12) United States Patent
Boudouris et al.

(10) Patent No.: US 10,513,621 B2
(45) Date of Patent: Dec. 24, 2019

(54) INK AND METHOD OF CONDUCTING AN EXAMINATION

(71) Applicant: Purdue Research Foundation, West Lafayette, IN (US)

(72) Inventors: Bryan William Boudouris, Lafayette, IN (US); Robert Randell Dodd, Indianapolis, IN (US); Jessica L. Sargent, West Lafayette, IN (US); Emily Alcorace, La Crescenta, CA (US)

(73) Assignee: Purdue Research Foundation, West Lafayette, IN (US)

( * ) Notice: Subject to any disclaimer, the term of this patent is extended or adjusted under 35 U.S.C. 154(b) by 265 days.

(21) Appl. No.: 15/552,832

(22) PCT Filed: Feb. 29, 2016

(86) PCT No.: PCT/US2016/020073
§ 371 (c)(1),
(2) Date: Aug. 23, 2017

(87) PCT Pub. No.: WO2016/138521
PCT Pub. Date: Sep. 1, 2016

(65) Prior Publication Data
US 2018/0030294 A1    Feb. 1, 2018

Related U.S. Application Data

(60) Provisional application No. 62/121,898, filed on Feb. 27, 2015.

(51) Int. Cl.
C09D 11/17    (2014.01)
C09D 11/20    (2006.01)
(Continued)

(52) U.S. Cl.
CPC .............. *C09D 11/17* (2013.01); *B43K 8/04* (2013.01); *C09D 11/16* (2013.01); *C09D 11/20* (2013.01); *B43K 8/06* (2013.01)

(58) Field of Classification Search
None
See application file for complete search history.

(56) References Cited

U.S. PATENT DOCUMENTS 2,852,398 A * 9/1958 Goessling .............. C09D 11/16
106/31.64
2,853,972 A * 9/1958 Cofield, Jr. .............. B43K 7/01
401/217

(Continued)

OTHER PUBLICATIONS

International Search Report, PCT/US16/020073, dated Jul. 25, 2016.

*Primary Examiner* — Helene Klemanski
(74) *Attorney, Agent, or Firm* — Purdue Research Foundation; Zhigang Rao

(57) ABSTRACT

An ink and method of conducting an examination suitable for reducing the likelihood that the students' answers on paper-based examinations may be changed at a later time prior to being graded. The ink includes a solution of marking particles, a suspension material, and a preserving material. A mark made with the ink is initially erasable for a predetermined period of time after the mark is formed and after the expiration of the predetermined period of time the mark is not erasable. The method of conducting an examination includes providing an ink to an individual, and then providing questions to an individual wherein the individual indicates answers to the questions by producing marks with the ink.

17 Claims, 6 Drawing Sheets

(51) Int. Cl.
  *C09D 11/16* (2014.01)
  *B43K 8/04* (2006.01)
  *B43K 8/06* (2006.01)

(56) References Cited

U.S. PATENT DOCUMENTS

| | | | | |
|---|---|---|---|---|
| 2,882,172 | A * | 4/1959 | Scobel | C09D 11/18 106/31.35 |
| 4,097,290 | A * | 6/1978 | Muller | C09D 11/18 106/241 |
| 4,329,264 | A | 5/1982 | Miller | |
| 4,349,639 | A * | 9/1982 | Muller | C09D 11/18 106/31.64 |
| 4,407,985 | A * | 10/1983 | Muller | C09D 11/18 401/190 |
| 4,410,643 | A * | 10/1983 | Muller | C09D 11/18 401/209 |
| 4,738,725 | A * | 4/1988 | Daugherty | C09D 11/18 106/31.64 |
| 4,830,670 | A | 5/1989 | Danyu | |
| 6,869,986 | B1 | 3/2005 | Millnot et al. | |
| 6,933,329 | B1 | 8/2005 | Meyrick et al. | |
| 6,986,809 | B2 * | 1/2006 | Spencer | C09D 11/16 106/31.86 |
| 2014/0247965 | A1 | 9/2014 | Van Wesep et al. | |

\* cited by examiner

Time until Erasure (minutes)

OMR Scan results

INK AND METHOD OF CONDUCTING AN EXAMINATION

CROSS REFERENCE TO RELATED APPLICATIONS

This application claims the benefit of International Application No. PCT/US16/20073, filed Feb. 29, 2016, which claims the benefit of U.S. Provisional Application No. 62/121,898, filed Feb. 27, 2015.

BACKGROUND OF THE INVENTION

The present invention generally relates to erasable writing compositions. The invention particularly relates to an ink formulation that allows for one to form a mark that is only erasable for a given period of time, and preferably includes the ability to tune the ink formulation to a desired period of time.

Academic dishonesty on standardized, high value examinations (e.g., state evaluation exams and college entrance exams) throughout the student population has been of great concern for many years. As such, a significant amount of identification, procedural, and engineering hurdles have been developed to verify that marks received by the students taking the examinations are a true reflection of the abilities of the students. However, a new mechanism and motivation for academic dishonesty on standardized examinations has emerged more recently. In particular, many high-profile cases have demonstrated that the proctors, educators, and administrators trusted with ensuring the fidelity of the completed testing materials are not above reproach. That is, recent incidents in major school systems in major American cities (e.g., Atlanta, Washington, D.C., Philadelphia, and Indianapolis) have shown that adults who are responsible for returning completed student examinations to the evaluation center have altered the students' exams in order to improve the overall scores of the school district. While the underlying economic and political motivations (e.g., financial incentives for educators and school districts that have top-performing scores) for these deceitful practices are complex in nature, it is blatantly apparent that the dishonesty of people more senior than the student test takers is of crucial import, and, currently, there exists no mechanism by which to prevent these types of cheating behaviors.

Furthermore, it is quite apparent that, due to the large scales utilized and low costs required in standardized and high value testing, that these tests will continue to remain paper-based (i.e., not computer-based) domestically for the foreseeable future, and the market for paper-based standardized tests will continue to grow as developing economies attempt to model the system prevalent in the United States. Therefore, the stakes for preventing academic dishonesty in paper-based standardized testing are rising, and the current systems being used address only one portion of the dishonesty spectrum. That is, despite the highly-refined (and costly) methodologies put in place currently to prevent student cheating, the weakest point in the overall prevention of academic dishonesty on high-value testing is still the simple "number 2" pencil because of the potential for cheating at the administration/reporting level.

Accordingly, there is a need for methods or devices by which students may complete paper-based examinations while reducing the likelihood that the students' answers may be changed at a later time by a third party prior to being marked appropriately by an external agency.

BRIEF DESCRIPTION OF THE INVENTION

The present invention provides an ink and method of conducting an examination suitable for reducing the likelihood that a student' answers on a paper-based examination may be changed at a later time prior to being graded.

According to one aspect of the invention, an ink having a composition includes a solution of marking particles, a suspension material, and a preserving material. A mark made with the composition of ink is initially erasable for a predetermined period of time after the mark is formed and after the expiration of the predetermined period of time the mark is not erasable.

According to another aspect of the invention, a method of conducting an examination includes providing an ink to an individual, and then providing questions to an individual wherein the individual indicates answers to the questions by producing marks with the ink. The marks made with the ink are initially erasable for a predetermined period of time after the mark is formed and after the expiration of the predetermined period of time the mark is not erasable.

Another aspect of the invention is a delivery device with means for forming the marks with the ink described above.

Technical effects of the ink and method of conducting an examination include the ability to greatly reduce post-examination cheating on standardized tests by reducing or eliminating the ability to erase marks on answer sheets after the expiration of the time period allowed for taking the examination.

Other aspects and advantages of this invention will be better appreciated from the following detailed description.

DETAILED DESCRIPTION OF THE INVENTION

Figure 1:
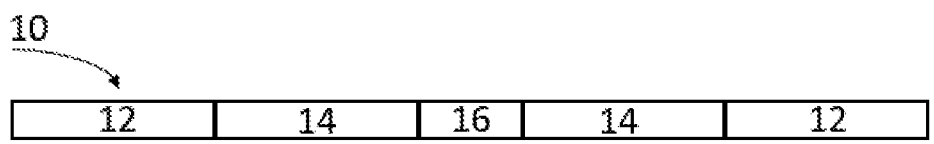
FIG. 1 represents an ink delivery device in accordance with a nonlimiting embodiment of this invention.

The present invention provides inks as well as methods and devices suitable for depositing the inks. The inks have compositions comprising a solution suitable for forming visible marks, with such marks being temporarily erasable for a predetermined period of time. Once a mark has been made with the ink, a preserving material within the solution may reduce or eliminate the ability to erase the mark after a predetermined period of time. By controlling the composition, concentration, etc. of the preserving material in the solution, the ink may be tailored such that a mark made with the ink can be erased for a predetermined period of time, for example, within about two hours, but the mark is not erasable past the predetermined period of time. Preferably, the specific composition and delivery method of the ink may be tailored to control the predetermined period of time for which the marks are erasable from anywhere from a few minutes to many hours.

According to one nonlimiting embodiment of the invention, a composition of an ink comprises a solution of marking particles suitable for providing visible color to the ink, one or more carrier or suspension materials used to suspend the marking particles in the solution, and a preserving material capable of reducing the ability of the marks to be erased after a predetermined period of time. The marking particles may be any material, as a nonlimiting example and in any concentration suitable for providing a visible color to marks formed with the ink. Nonlimiting examples of suitable marking particles include mesoporous carbon nanopowder (preferably, graphitized, <500 nm particle size, >99.95% trace metals basis), or carbon black/graphite powder (<20 μm particle size, synthetic). According to one nonlimiting embodiment, the marking particles include carbon particles in a concentration sufficient such that marks formed with the ink may be identifiable by an automated grading system of the types used to grade standardized student examinations, such as state evaluation exams and college entrance exams.

The one or more suspension materials used to suspend the marking particles in the solution may include any materials suitable for and in any concentration sufficient for suspending the marking particles. Nonlimiting examples of suitable suspension materials include acetone alone, or a combination of acetone and isopropyl alcohol or ethylene glycol.

The preserving material may include any material or composition, and in any concentration suitable for limiting the ability to erase marks formed with the ink after a predetermined period of time. According to one nonlimiting example, the preserving material includes an epoxy that cures over time (under normal ambient conditions, e.g., room temperature), preferably as a result of water-initiated cross-linking organic small molecules. That is, the mechanism for curing is preferably a reaction between the precursor epoxy materials and atmospheric moisture (i.e., water vapor) in order to cross-link the precursor materials to form a set polymer epoxy. In such an embodiment, the predetermined time period for erasing marks made with the ink may be dependant on the time-sensitive behavior of the epoxy's curing. Specifically, the predetermined time period would be considered to have expired once such epoxy has set sufficiently as to prevent the ability to fully erase a mark made with the ink. The cross-linking of the epoxy may generate macromolecular materials that are resistant to dissolution in common aqueous and organic solvents (i.e., in a manner similar to how epoxy sets in common household applications). Nonlimiting examples of suitable preserving materials include 4,4'-methylenebis(phenyl isocyanate) and p-toluenesulfonyl isocyanate, isocyanate-based polyurethanes, or water-cured polyurethanes or epoxies that are soluble in non-toxic organic solvents.

In addition to the marking particles, suspension materials, and preserving materials, the ink may include any material suitable for use in inks. For example, the ink may include one or more filler materials, nonlimiting examples including polystyrene (PS) or poly(vinyl pyrrolidone) (PVP), capable of adjusting the viscosity of the ink without otherwise affecting the cross-linking process.

During investigations leading to the present invention, preferred ink compositions were determined to include 1-5 mg/mL mesoporous carbon as the marking material, mixtures containing at least 60% acetone and the remainder being a mixture of ethylene glycol and isopropyl alcohol as the suspension materials, and 10 mg/mL to 50 mg/mL of 4,4'-methylenebis(phenyl isocyanate) and 10 mg/mL to 50 mg/mL mg/mL p-toluenesulfonyl isocyanate as the preserving materials. Ink having such compositions were observed to have cure times ranging from 0.1 to 6 hours. Generally, a higher solids content yielded a longer cure time. A particularly preferred composition is believed to include 5 mg/mL mesoporous carbon as the marking material, 100% acetone as the suspension material, and 25 mg/mL 4,4'-methylenebis(phenyl isocyanate) and 25 mg/mL p-toluenesulfonyl isocyanate as the preserving material (cure time: 1 to 1.5 hours). Various ink compositions tested during the investigations are listed in Table 1 and their cure times are listed in Table 2.

TABLE 1

Ink compositions.

|  | Ink 1 | Ink 2 | Ink 3 | Ink 4 | Ink 5 | Ink 6 | Ink 7 | Ink 8 |
|---|---|---|---|---|---|---|---|---|
| graphite (mg/mL) | 1-10 |  | 15 |  |  |  |  |  |
| mesoporous carbon (mg/mL) |  | 5 |  | 5 | 5 | 10 | 3 | 4 |
| acetone (% of suspension materials) | 80-100 | 60 | 80-100 | 90 | 60 | 80 | 100 | 95-100 |
| ethylene glycol (% of suspension materials) | 0-20 |  | 0-20 | 10 |  | 20 |  | 0-5 |
| isopropyl alcohol (% of suspension materials) |  | 40 |  |  | 40 |  |  |  |
| 4,4'-methylenebis (phenyl isocyanate) (mg/mL) | 10-50 | 10-40 | 50 | 25 | 20 | 25 | 25 | 10-25 |
| p-toluenesulfonyl isocyanate (mg/mL) | 10-50 | 10-40 | 50 | 25 | 20 | 25 | 25 | 10-25 |
| PS (~10 kg/mol) (mg/mL) |  |  |  |  | 50 | 25-50 |  |  |
| PVP (mg/mL) |  |  |  |  |  |  | 0-25 | 10-25 |

TABLE 2

Cure time of ink compositions.

|  | Ink 1 | Ink 2 | Ink 3 | Ink 4 | Ink 5 | Ink 6 | Ink 7 | Ink 8 |
|---|---|---|---|---|---|---|---|---|
| Cure Time (minutes) | 0-360 | 15-60 | 120-240 | 120-240 | 60-90 | 90-150 | 5-30 | 60-150 |

Figure 4:
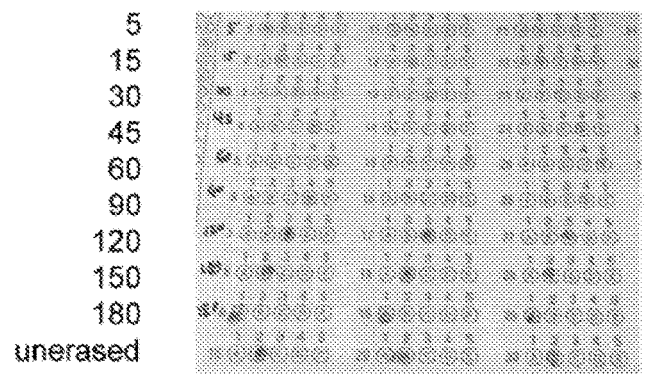
FIGS. 4 through 6 show samples of ink erased at various times and corresponding OMR scan results for the samples of ink for a delivery device having a new tip used with average writing pressure, a reused tip used with above average writing pressure, and a reused tip used with average writing pressure, respectively.
Figure 4:
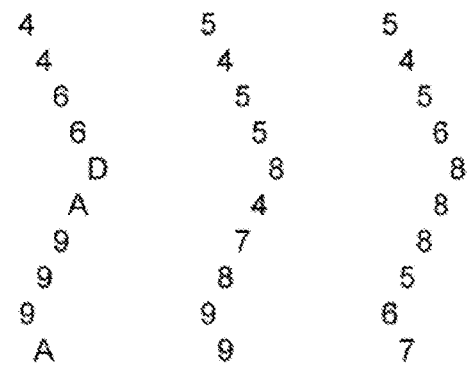
Figure 5:
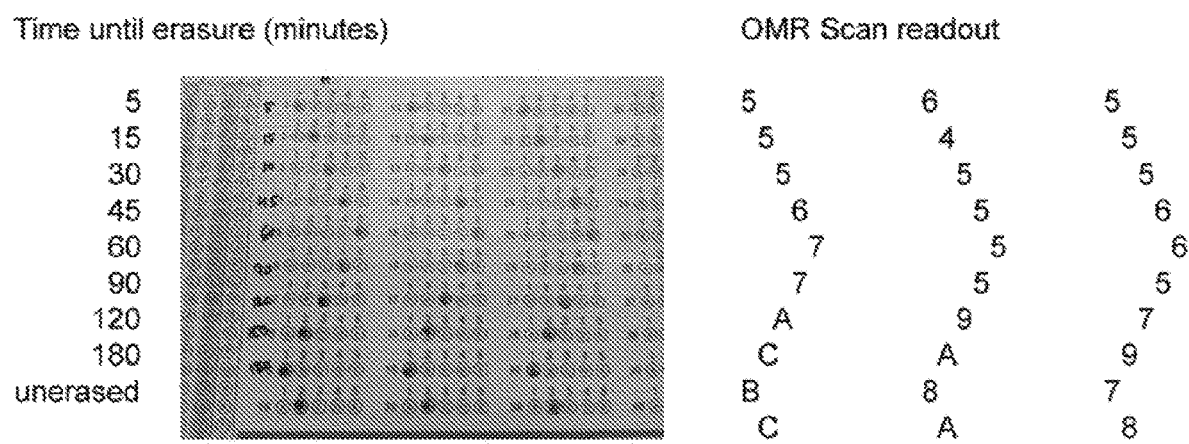
Figure 6:
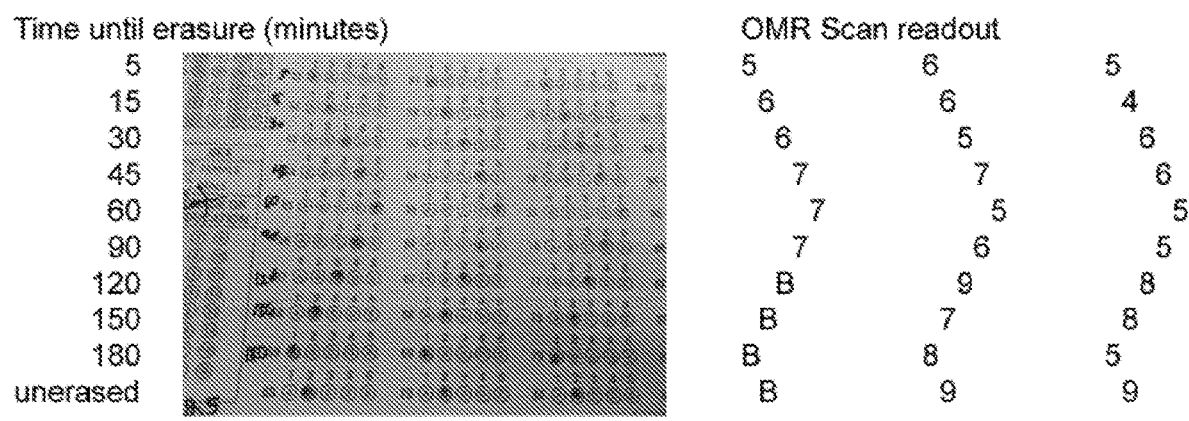

FIGS. 4 through 6 represent samples from investigations leading to the present invention. Each figure includes an image of an answer sheet of the type commonly used during standardized student examinations, specifically a Scantron® Optical Mark Recognition (OMR) scan form, commonly referred to as a "bubble" sheet. During the investigation, a single mark was formed in each answer row of the answer sheet, alternating by bubbles A, B, C, D, and E for each successive mark. Subsequently, attempts were made to erase each mark after predetermined time periods. A column to the left of the answer sheet (labeled "Time until Erasure (minutes)) indicates a time period waited prior to the attempt to erase each row of marks. More particularly, at a start time (time=zero minutes) all of the marks were made. Then at subsequent times (five minutes, fifteen minutes, thirty minutes, etc.) the bubbles were erased using a standard pencil eraser. For example, the marks in numbered row 1 were erased after five minutes, the marks in numbered row 2 were erased after ten minutes, etc. Referring to FIG. 4 as an example, marks which set for only about sixty minutes or less were capable of being at least partially erased. After about sixty minutes, the mark was not erasable to a degree considered acceptable for student examination purposes. Each trial was performed in three columns (rows 1-30) of the answer sheet for reliability of results, that is, there were three marks made for each time period tested for each trial.

A column to the right of each image of the answer sheets (labeled "OMR Scan results/readout") indicates the results after the answer sheets were automatically read by a grading system of the types commonly used to grade standardized student examinations, specifically a Scantron® OMR scanner machine. The machine uses an arbitrary scale where the number 1 indicates no mark and the number 9 (or an alphabet character) represents a very dark mark, with intermediate darkness marks therebetween. If there are multiple marks in the same answer grid, the machine determines a "final answer" (e.g., A, B, C, D, or E) as the darkest one of the multiple marks. Again referring to FIG. 4 as an example, marks erased within forty-five minutes were read as 4's through 6's while the marks attempted to be erased after forty-five minutes were read as 8's or greater. As such, the relative darkness of the erased and unerased marks was clearly identifiable by the machine.

The sample of FIG. 4 was intended to be representative of a "standard" test with "normal" pressure (e.g., a student who is applying an average amount of pressure when applying the marks). The sample of FIG. 5 was intended to represent "high pressure" conditions (e.g., a student who is applying an above average about of pressure while forming the marks). The sample of FIG. 6 was intended to represent "light pressure" conditions (e.g., a student who is applying a below average amount of pressure while forming the marks). Consistent with the above-noted results of FIG. 4, FIGS. 5 and 6 show that the relative darkness of the marks are clearly identifiable by the machine, and it would be possible for the machine to identify "final answers" as those being marks that were not erased prior to the end of the time period.

The investigations leading to the present invention indicated that residue that remains after deposition and drying of the ink may be read and analyzed by common automated grading equipment. Using the Scantron® OMR scanner machine, it was determined that the marking behavior of the ink may be similar to that of a common "number 2" pencil.

Figure 2:
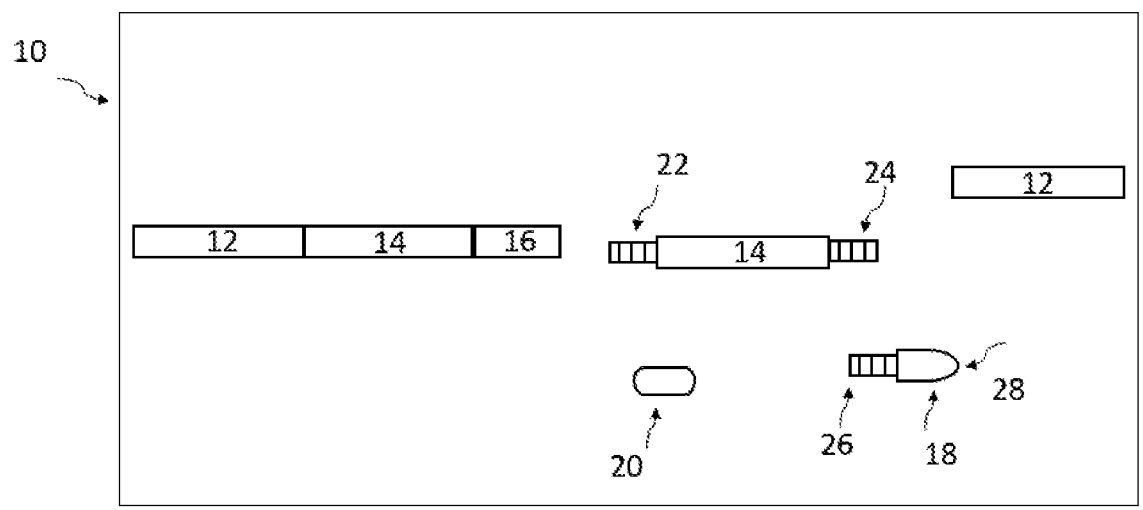
FIG. 2 represents the ink delivery device of FIG. 1 in a partially disassembled state.
Figure 3:
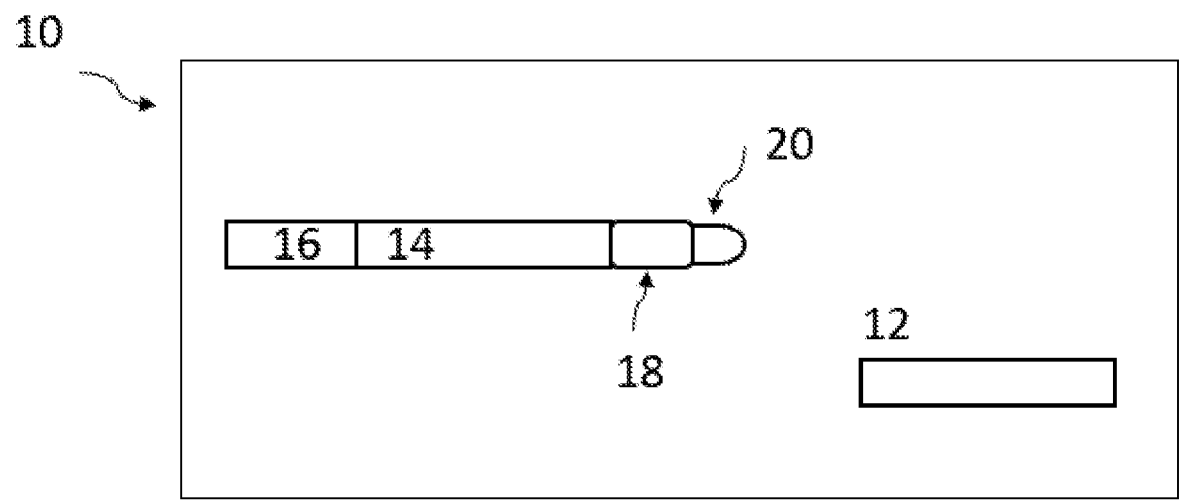
FIG. 3 represents the ink delivery device of FIG. 1 with a cap removed from a distal end thereof to expose a tip configured to dispense ink therefrom.

In order to deliver the ink, a specialized delivery system may be provided which preferably fits inside the casing of a normal pen/pencil shell. For example, it is foreseeable that the delivery method may include a drop-in replacement for current marking devices. FIGS. 1 through 3 represent a nonlimiting embodiment of a delivery device 10 suitable for holding and selectively dispensing inks encompassed by the teachings of the invention. The delivery device 10 represented in FIGS. 1 through 3 includes two mixing chambers 14, a joining section 16, two caps 12, two tip holders 18 (FIGS. 2 and 3), and two tips 20 (FIGS. 2 and 3). The delivery device 10 further includes means for assembling the various components 12, 14, 16, 18, and 20. In particular, each component 12, 14, 16, 18, and 20 may include members that interact or couple with corresponding members on one of the other components 12, 14, 16, 18, and 20. For example, distal ends of the components 12, 14, 16, 18, and 20 may include mechanical threaded portions configured to mate with corresponding mechanical threaded portions of adjacent components 12, 14, 16, 18, and 20. In FIG. 2, the delivery device includes male threads 22 and 26 on distal ends of the mixing chambers 14 and tip holders 18, respectively, configured to mate with female threads (not shown) located within corresponding ends of the joining section 16 and mixing chambers 14, respectively. As such, the mixing chambers 14 may be screwed into and secured to the joining section 16, and the tip holders 18 may be screwed into and secured to the mixing chambers 14 to define an assembled body of the delivery device 10.

Each tip holder 18 comprises an end 28 configured to receive and secure a tip 20 suitable for forming marks with the ink. The tips 20 may be individually configured to form a mark of any shape and, preferably the tips 20 are removable and disposable. The tip holders 18 may be configured to couple with any number of different types of tips 20. FIG. 3 represents the tip 20 and tip holder 18 assembled together and to the mixing chambers 14.

At least the mixing chambers 14 and the tip holders 18 comprise a hollow channel therein suitable for retaining an amount of the ink therein. The joining section 16 may include a hollow channel therethough, such that the ink retained in both mixing chambers 14 may mix freely, or may define a seal, such that the ink retained in the individual mixing chambers 14 are kept separate. Preferable, the tip holders 18 and/or tips 20 comprise means for selectively and controllably dispensing the ink to from the mixing chambers 14, through the tip holders 18, and through the tips 20 to a surface marked therewith. Caps 12 may be configured to secure to the assembled body of the delivery device to cover the tips 20 to prevent unintentional markings. Preferably, at least one of the tips 20 are sized and shaped to correspond to the size and shape of a "bubble" on an answer sheet of a common standardized test such that students may fill a bubble with a single "dab" or stroke of the tip 20, rather than performing multiple strokes/motions (for example, circular motion) to fill the entirety of the bubble, as is common when using a number 2 pencil.

According to one nonlimiting embodiment of the invention, the ink is configured to be used during an examination in a manner similar to common pencils when utilized by the students. Preferably, the ink is non-toxic and flows in a manner that is consistent with typical inks used in common ink pens (i.e., having a viscosity of about 1 cP). After the student has submitted the examination, the marks on the paper are preferably permanent. As such, they likelihood that they could be changed between when the student completes the exam and when the exam administrators ship the examinations to the independent marking facility would be significantly reduced.

In view of the above, it can be seen that a significant advantage of this invention is that the inks and delivery methods provide a means for creating marks which are erasable for a limited amount of time, after which the marks become permanent. Among other applications, use of this ink by students during paper-based examinations could significantly reduce post-exam cheating. Specifically, a student would be capable of marking and erasing such marks during the time period provided for the exam. However, the ink can be formulated such that the marks become permanent after the expiration of the time period provided for the exam. In this way, individuals would not be capable of erasing and replacing incorrect answers post-examination.

Therefore, according to one nonlimiting embodiment of the invention, an examination may be conducted by providing the ink to an individual and then providing questions to the individual wherein the individual indicates answers to the questions by producing marks, for example on a paper, with the ink. Preferably, the marks made with the ink are initially erasable for a predetermined period of time after the marks are formed and after the expiration of the predetermined period of time the marks are not erasable. Preferably, the examination is graded by scanning the marks with an automated grading system. In addition, the ink may be produced before the examination to configure the erasable period of time to be based on an amount of time allowed for the completion of the examination. For example, it is believed that a suitable erasable period of time for the ink is about 0.5 to 4 hours, which is believed to be common for standardized examinations.

While the invention has been described in terms of specific embodiments, it is apparent that other forms could be adopted by one skilled in the art. For example, the physical configuration of the delivery device 10 could differ from that shown, specific compositions of the ink could be modified, other applications of the ink are foreseeable, and materials and processes/methods other than those noted could be used. Therefore, the scope of the invention is to be limited only by the following claims.

The invention claimed is:

1. An ink having a composition comprising: a solution comprising marking particles, a suspension material, and a preserving material, wherein the marking particles comprise mesoporous carbon nanopowder, wherein a mark made with the ink is initially erasable for a predetermined period of time after the mark is formed and after the expiration of the predetermined period of time the mark is not erasable.

2. The ink of claim 1, wherein the preserving material reduces or eliminates the ability of a mark to be erased after the predetermined period of time.

3. The ink of claim 1, wherein the suspension material comprises acetone, or a combination of acetone and either isopropyl alcohol or ethylene glycol.

4. The ink of claim 1, wherein the preserving material is an epoxy.

5. The ink of claim 1, wherein the preserving material comprises a combination of 4,4'-methylenebis(phenyl isocyanate) and p-toluenesulfonyl isocyanate.

6. The ink of claim 1, wherein the solution comprises mesoporous carbon as the marking material, acetone as the suspension material, and a combination of 4,4'-methylenebis(phenyl isocyanate) and p-toluenesulfonyl isocyanate as the preserving material.

7. A delivery device for forming marks with the ink of claim 1.

8. A method of using the ink of claim 1, the method comprising: providing the ink to an individual; and then conducting an examination wherein the individual indicates answers to the examination by producing marks with the ink.

9. The method of claim 8, further comprising: producing the ink prior to providing the ink to the individual such the predetermined period of time is based on an amount of time allowed for the completion of the examination.

10. The method of claim 8, further comprising: grading the examination by scanning the marks with an automated grading system after the individual produces the marks.

11. A method of conducting an examination, the method comprising: providing an ink to an individual; and then providing questions to the individual wherein the individual indicates answers to the questions by producing marks with the ink; wherein the marks made with the ink are initially erasable for a predetermined period of time after the marks are formed and after the expiration of the predetermined period of time the marks are not erasable, wherein the ink comprises a composition comprising a solution that comprises marking particles, a suspension material, and a preserving material, wherein the marking particles comprise mesoporous carbon nanopowder.

12. The method of claim 11, further comprising: grading the examination by scanning the marks with an automated grading system after the individual produces the marks.

13. The method of claim 11, further comprising: producing the ink prior to providing the ink to the individual such the predetermined period of time is based on an amount of time allowed for the completion of the examination.

14. The method of claim 11, further comprising: producing the ink to comprise a solution of at least marking particles, a suspension material, and a preserving material, wherein the preserving material reduces or eliminates the ability of the marks to be erased after the predetermined period of time.

15. The method of claim 14, wherein the suspension material comprises acetone, or a combination of acetone and either isopropyl alcohol or ethylene glycol.

16. The method of claim 14, wherein the preserving material comprises 4,4'-methylenebis(phenyl isocyanate) and p-toluenesulfonyl isocyanate.

17. The method of claim 14, wherein the solution comprises comprises mesoporous carbon as the marking material, acetone as the suspension material, and a combination of 4,4'-methylenebis(phenyl isocyanate) and p-toluenesulfonyl isocyanate as the preserving material.

* * * * *